US006569957B2

(12) United States Patent
Williams et al.

(10) Patent No.: US 6,569,957 B2
(45) Date of Patent: May 27, 2003

(54) BLENDS OF POLYCARBONATE AND POLYESTER AND SHEETS AND FILMS FORMED THEREFROM

(75) Inventors: James Carl Williams, Blountville, TN (US); John Guthrie Thompson, Kingsport, TN (US); Roy Lee Conn, Highlands Ranch, CO (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/946,989

(22) Filed: Sep. 5, 2001

(65) Prior Publication Data

US 2002/0086953 A1 Jul. 4, 2002

Related U.S. Application Data

(60) Provisional application No. 60/245,890, filed on Nov. 3, 2000.

(51) Int. Cl.[7] ................................. C08L 67/02
(52) U.S. Cl. ................ 525/439; 525/448; 525/466; 524/128; 524/537
(58) Field of Search ................ 525/448, 439; 524/128, 537

(56) References Cited

U.S. PATENT DOCUMENTS

| 3,028,365 | A | 4/1962 | Schnell et al. |
|---|---|---|---|
| 3,153,008 | A | 10/1964 | Fox |
| 3,305,604 | A | 2/1967 | Armstrong et al. |
| 3,334,154 | A | 8/1967 | Kim |
| 3,772,405 | A | 11/1973 | Hamb |
| 3,915,926 | A | 10/1975 | Wambach |
| 4,018,750 | A | 4/1977 | Onizawa |
| 4,123,436 | A | 10/1978 | Holub et al. |
| 4,188,314 | A | 2/1980 | Fox et al. |
| 4,391,954 | A | 7/1983 | Scott |
| 4,521,556 | A | 6/1985 | Adams |
| 4,619,976 | A | 10/1986 | Morris et al. |
| 4,740,581 | A | 4/1988 | Pruett et al. |
| 4,749,755 | A | 6/1988 | Baysch et al. |
| 4,749,772 | A | 6/1988 | Weaver et al. |
| 4,749,773 | A | 6/1988 | Weaver et al. |
| 4,749,774 | A | 6/1988 | Weaver et al. |
| 4,786,692 | A | 11/1988 | Allen et al. |
| 4,897,453 | A | 1/1990 | Flora et al. |
| 4,950,732 | A | 8/1990 | Weaver et al. |
| 5,045,596 | A | 9/1991 | Laughner |
| 5,194,523 | A | 3/1993 | Small, Jr. et al. |
| 5,207,967 | A | 5/1993 | Small, Jr. et al. |
| 5,239,020 | A | 8/1993 | Morris |
| 5,252,699 | A | 10/1993 | Chamberlin et al. |
| 5,254,610 | A | 10/1993 | Small, Jr. et al. |
| 5,340,910 | A | 8/1994 | Chamberlin et al. |
| 5,372,864 | A | 12/1994 | Weaver et al. |
| 5,384,377 | A | 1/1995 | Weaver et al. |
| 5,399,595 | A | 3/1995 | Sublett et al. |
| 5,420,212 | A | 5/1995 | Light |
| 5,461,120 | A | 10/1995 | Mason et al. |
| 5,478,896 | A | 12/1995 | Scott |
| 5,482,977 | A | 1/1996 | McConnell et al. |
| 5,654,347 | A | 8/1997 | Khemani et al. |
| 5,674,928 | A | 10/1997 | Chisholm et al. |
| 5,681,905 | A | 10/1997 | Mason et al. |
| 5,681,918 | A | 10/1997 | Adams et al. |
| 5,731,389 | A | 3/1998 | Bailly et al. |
| 5,942,585 | A | 8/1999 | Scott et al. |
| 6,037,424 | A | 3/2000 | Scott et al. |
| 6,043,322 | A | 3/2000 | Scott et al. |

FOREIGN PATENT DOCUMENTS

| EP | 0 226 974 | 7/1987 |
|---|---|---|
| EP | 0 717 071 | 6/1996 |
| JP | 2000063641 A | 2/2000 |
| JP | 2000238223 A | 9/2000 |
| JP | 2000318107 A | 11/2000 |
| JP | 2000327890 A | 11/2000 |
| JP | 2000327893 A | 11/2000 |
| WO | WO87 01122 | 2/1987 |

*Primary Examiner*—Patricia A Short
(74) *Attorney, Agent, or Firm*—B. J. Boshears; Bernie Graves

(57) ABSTRACT

There is described a novel blend composition comprising specified amounts of any polycarbonate and specified amounts of a specific copolyester comprising terephthalic acid, naphthalenedicarboxylic acid, 1,4-cyclohexanedicarboxylic acid, or mixtures thereof; isophthalic acid; and 1,4-cyclohexanedimethanol. Also described are films and sheets produced from the novel blend compositions that are thermoformable without having to pre-dry the films and sheets. Further, articles of manufacture produced from the novel blend compositions are described.

10 Claims, No Drawings

BLENDS OF POLYCARBONATE AND POLYESTER AND SHEETS AND FILMS FORMED THEREFROM

CROSS REFERENCE TO RELATED APPLICATION

This application claims priority under 35 U.S.C. §119(e) to U.S. Provisional Application Ser. No. 60/245,890 filed Nov. 3, 2000.

FIELD OF THE INVENTION

This invention relates to blends of polycarbonates and polyesters, and sheets and films formed therefrom that may be thermoformed without having to pre-dry the sheets and films.

BACKGROUND OF THE INVENTION

Polycarbonates are widely used in a variety of molding and extrusion applications. Films or sheets formed from the polycarbonates must be dried prior to thermoforming. If not pre-dried, thermoformed articles formed from the polycarbonates are characterized by the presence of blisters that are unacceptable from an appearance standpoint. Therefore, it would be desirable to provide a manner of forming thermoformed articles without the necessity of pre-drying the polycarbonate sheets or films.

SUMMARY OF THE INVENTION

It is accordingly an object of the present invention to provide novel blends or compositions of polycarbonates and specific copolyesters.

It is a further object of this invention to provide novel films and sheets produced from the novel blends or compositions, which films and sheets are thermoformable without previous drying thereof, and wherein the presence of blisters is avoided.

These and other objects and advantages of the present invention will be apparent to those skilled in the art from the following detailed description and claims.

In accordance with the present invention, it has been found that the above and still further objects are achieved by combining at least one or more polycarbonates and at least one or more specified copolyesters, in specific proportions, to provide a new and novel blend or composition that is useful for many applications. In particular, novel sheets and films produced from the novel blends or compositions may be used for packaging food, clothing, pharmaceutical products, signs and skylights, and the like; and, unexpectedly it has been found that the sheets or films may be thermoformed without a necessity of pre-drying and produce articles free of undesirable blisters.

More particularly, in accordance with the present invention, a blend or composition is provided comprising from about 15 to about 40 weight percent (%) polycarbonate and from about 60 to about 85 weight % copolyester. Any polycarbonate may be used. The specific copolyesters used are based on an acid component comprising terephthalic acid, naphthalenedicarboxylic acid, cyclohexanedicarboxylic acid, or mixtures thereof containing from 15 to about 35 mol percent (%) isophthalic acid and a glycol component comprising from about 80 to 100 mol % 1,4-cyclohexanedimethanol.

In addition to the novel compositions, the present invention is also directed to films and sheets formed from the novel blends that are thermoformable without pre-drying, to provide articles and profiles free of blisters.

Additionally, the present invention is directed to articles of manufacture incorporating the novel compositions and films of the present invention.

DETAILED DESCRIPTION OF THE INVENTION

The novel blends or compositions of the present invention comprise at least one, or more, polycarbonates and at least one, or more specified copolyesters. The polycarbonate is present in an amount ranging from about 15 to about 40 weight %, based on the weight of the total blend or composition, and the copolyester is present in an amount ranging from about 60 to about 85 weight %, both based on the weight of the total blend or composition. The polycarbonate is preferably present in an amount of about 20 to 28 weight percent and the copolyester is preferably present in an amount of about 80 to 72 weight percent, based on the weight of the total blend composition.

The polycarbonate component of the blend or composition may be any polycarbonate. The polycarbonates suitable for use in the present invention are well known and are generally commercially available. The polycarbonates may be branched or linear. Suitable polycarbonates are exemplified, but not limited to, those described in U.S. Pat. Nos. 3,028,365; 3,334,154; 3,915,926; 4,897,453; 5,674,928; and 5,681,905, all of which are incorporated herein by reference. The polycarbonates may be prepared by a variety of conventional and well known processes which include transesterification, melt polymerization, interfacial polymerization, and the like. The polycarbonates are generally prepared by reacting a dihydric phenol with a carbonate precursor, such as phosgene. Suitable processes for preparing the polycarbonates of the present invention are described, for example, in U.S. Pat. Nos. 4,018,750; 4,123,436; and 3,153,008. Preferred polycarbonates for use in the present invention are aromatic polycarbonates, with aromatic polycarbonates based on bisphenol-A [2,2-bis(4-hydroxyphenyl) propane], such as are obtained by reacting bisphenol-A with phosgene, being more preferred. Diphenyl carbonate or dibutyl carbonate may be utilized in place of phosgene.

The copolyester component of the of the blend or composition of the present invention is at least one, or more of poly(1,4-cyclohexylenedimethylene terephthalate) (PCT), poly(1,4-cyclohexylenedimethylene naphthalenedicarboxylate) (PCN), poly(1,4-cyclohexylenedimethylene 1,4-cyclohexanedicarboxylate) (PCC) copolyesters, or mixtures thereof, containing 15 to about 35 mol % isophthalic acid with a preferred amount being from 20 to about 30 mol % isophthalic acid. The copolyester comprises an acid component comprising from about 65 to about 85 mol percent of a dicarboxylic acid selected from terephthalic acid, naphthalenedicarboxylic acid, 1,4-cyclohexanedicarboxylic acid or mixtures thereof; from about 15 to about 35 mol percent isophthalic acid; and from 0 to about 20 mol percent of other dicarboxylic acid units. The copolyester comprises a glycol component of about 80 to 100 mol percent 1,4-cyclohexanedimethanol (CHDM) and from 0 to about 20 mol percent other glycol units. The total dicarboxylic acid units is equal to 100 mol percent, the total glycol units is equal to 100 mol percent and the total polyester units is equal to 200 mol percent.

The CHDM and 1,4-cyclohexanedicarboxylic acid moieties used to prepare the copolyesters can be trans, cis or trans/cis mixtures of isomers. Any of the naphthalenedicarboxylic acid isomers or mixtures of isomers can be used with the 1,4-, 1,5-, 2,6-, and 2,7-isomers being preferred.

The other dicarboxylic acid(s) that can be used herein in amounts of from 0 to about 20 mol percent have from about 4 to about 40 carbon atoms. Exemplary of the other dicarboxylic acids suitable for use herein are sulfoisophthalic, sulfodibenzoic, succinic, glutaric, adipic, sebacic, suberic, dimer, dodecanedioic, and the like, or mixtures thereof.

The other glycol unit(s) that can be used herein in amounts of from 0 to about 20 mol percent contain from about 3 to about 12 carbon atoms. Exemplary of the other glycols suitable for use herein are propylene glycol, 1,3-propanediol, 1,4-butanediol, 1,5-pentanediol, 1,6-hexanediol, neopentyl glycol, 2,2,4,4-tetramethyl-1,3-cyclobutanediol, diethylene glycol, and the like, or mixtures thereof.

With respect to the composition of the copolyester, the glycol component preferably comprises 100 mol percent of 1,4-cyclohexanedimethanol. In another preferred embodiment, the acid component of the copolyester comprises 65 to 85 mol percent terephthalic acid. In a most preferred embodiment, the copolyester composition comprises 100 mol percent 1,4-cyclohexanedimethanol, about 26 mol percent isophthalic acid, and about 74 mol percent terephthalic acid.

The copolyester component of the blends of the present invention preferably have an inherent viscosity (I.V.) of from about 0.5 to about 1.5 dL/g, determined in accordance with ASTM Test Method D2857-70.

The copolyester component of the blends of the present invention may be prepared by processes well known in the art. For example, the copolyester components may be readily prepared by batch or continuous processes. These copolyesters are typically made in melt phase polycondensation reactions. However it is possible to use solid phase build up techniques well known in the art, if desired.

One suitable method includes the step of reacting one or more dicarboxylic acids with one or more glycols at a temperature of about 100° C. to about 315° C. at a pressure of about 0.1 to 760 mm (millimeter) mercury for a time sufficient to form a polyester. For methods of producing polyesters, reference is made to U.S. Pat. No. 3,772,405, the contents of which are incorporated herein by reference.

Furthermore, the copolyesters of the present invention can be prepared by condensation of the appropriate raw materials using either batch or continuous operations well known in the art. It is possible to use dicarboxylic acids or their corresponding lower alkyl esters such as the methyl esters in the polymerization reactions. When using the methyl esters, it is desirable to use titanium, manganese or zinc based catalysts in the initial ester interchange step and titanium, antimony, germanium, or tin based catalysts for the polycondensation step. A preferred catalyst is based on about 10 to about 100 ppm of titanium and 0 to about 75 ppm manganese. During the buildup phase, it is desirable to add from about 10 to about 90 ppm of a phosphorus-containing compound to serve as a color stabilizer. Typically, a phosphorus-containing additive is added in the form of a phosphate, such as phosphoric acid or an organic phosphate ester. Typically lower amounts of phosphorus inhibitors are employed when using lower amounts of titanium in the catalyst system. Suitable phosphate esters for use in preparing the copolyesters of the invention include, but are not limited to, ethyl acid phosphate, diethyl acid phosphate, arylalkyl phosphates and trialkyl phosphates such as triethyl phosphate and tris-2-ethylhexyl phosphate.

In forming the copolyesters of the invention, colorants, sometimes referred to as toners, may be added to impart a desired neutral hue and/or brightness to the resulting copolyester. A preferred method of including colorants is to use a colorant having thermally stable organic colored compounds having reactive end groups such that the colorant is copolymerized and incorporated into the copolyester to improve the hue of the copolyester. For example, colorants such as dyes possessing reactive hydroxyl or carboxyl groups, including but not limited to, blue and red substituted anthraquinones may be copolymerized into the polymer chain. Suitable colorants and dyes are described in detail in U.S. Pat. Nos. 4,521,556; 4,740,581; 4,749,772; 4,749,773; 4,749,774; 4,950,732; 5,252,699; 5,384,377; 5,372,864; 5,340,910; and 5,681,918, herein incorporated by reference in their entirety. When dyes are used as colorants, they may be added during or after an ester interchange or direct esterification reaction. The total amount of dye is generally about 10 ppm or less. It is also possible to use small amounts of cobalt as a toner material. In such cases, the cobalt serves as both a toner as well as a polymer buildup catalyst.

The blends of the present invention may comprise more than one polycarbonate, and more than one copolyester, if desired.

The polycarbonate/copolyester blends of the present invention can be prepared by any technique known in the art. For example, the blends can be prepared by making pellet blends that are then extruded and pelletized. Alternately, pellets of polycarbonate and copolyester may be fed separately and the melts mixed prior to the extrusion operation to form film, sheeting or profiles. The melt blending and extrusion operations are generally conducted at temperatures ranging from about 425° F. (218° C.) to about 580° F. (304° C.).

Alternatively, the polycarbonate and copolyester components may be weighed and placed in a plastic bag. The bag is shaken or tumbled by hand to blend the components. This blend can then be fed to an extruder to produce sheeting or film. This technique is useful for small-scale work. In larger scale work, the polycarbonate and copolyester components may be placed in separate hoppers and then metered into the extruder to provide the appropriate blend composition. Further, the polycarbonate and copolyester components may be melt blended in a melt mixing tank, in a sigma blade mixer or in a single or twin screw extruder followed by pelletization or granulation of the blend. This melt mixed blend may then be extruded into film or sheeting.

Further, the blends of the present invention can be made by methods which include the steps of blending the polycarbonate and copolyester portions of the present invention at a temperature of about 25° C. (77° F.) to 300° C. (572° F.) for a time sufficient to form a blend composition. Suitable conventional blending techniques include the melt method and the solution-prepared method. Other suitable blending techniques include dry blending and/or extrusion.

The melt blending method includes blending the polymers at a temperature sufficient to melt the polycarbonate and copolyester portions, and thereafter cooling the blend to a temperature sufficient to produce a blend. The term "melt" as used herein includes, but is not limited to, merely softening the polymers. For melt mixing methods generally known in the polymers art, see Mixing and Compounding of Polymers (I. Manas-Zloczower & Z. Tadmor eds, Carl Hanser Verlag publisher, New York 1994).

The solution-prepared method includes dissolving the appropriate weight/weight ratio of copolyester and polycarbonate in a suitable organic solvent such as methylene chloride, mixing the solution, and separating the blend composition from solution by precipitation of the blend or by evaporation of the solvent. Solution-prepared blending methods are generally known in the polymers art.

The blends of the present invention can also contain antioxidants, conventional flame retardants such as phosphorus or halogen compounds, or fillers such as talc or mica, or reinforcing agents such as glass fiber, or carbon fiber. Additives such as pigments, dyes, stabilizers, plasticizers, nucleating agents, and the like, can also be used in the polyesters, polycarbonates, and blends of the present invention to further modify the properties of the inventive blends.

The blends of the present invention are useful in producing molded articles, fibers, films and sheeting.

The blends of polycarbonate and copolyester of the present invention may be foamed during the extrusion operations using techniques well known in the art. For example, useful foaming techniques are disclosed in U.S. Pat. Nos. 5,399,595; 5,482,977; and 5,654,347.

Blends of polycarbonate and copolyesters of the present invention tend to exhibit a yellow coloration. The yellow coloration can be suppressed by adding a phosphite stabilizer to the blend. The phosphite stabilizer may be added as the polycarbonate and the copolyester are extruded. In a preferred embodiment, there is prepared a masterbatch of a suitable phosphite stabilizer in either of the polymer components of the blend. The masterbatch contains from about 2 to about 20 weight percent (%) of the phosphite stabilizer. One suitable stabilizer is distearyl pentaerythritol diphosphite. The resultant polymer blends will generally contain from about 0.1 to about 0.5 weight % phosphite stabilizer.

The extruded objects of this invention have a wide range of commercial uses. For example, films and sheeting are useful for signs, skylights, the packaging of foods, clothing, pharmaceutical products and the like. Extruded sheeting may be used as is or thermoformed to provide packaging for foods, hardware and the like.

In addition to the novel blends or compositions, the present invention is also directed to films and sheeting, formed from the novel blends or compositions, that are thermoformable without the necessity of pre-drying the films and sheets, and wherein the presence of blisters is avoided.

The compositions of the present invention may be fabricated into films or sheeting by any technique known in the art. For example, films may be produced by well known cast film, blown film and extrusion coating techniques, the latter including extrusion onto a substrate. Films produced by melt casting or blowing can be thermally bonded or sealed to a substrate using an adhesive. The ordinary artisan, in possession of the present disclosure, can prepare such films and articles containing such films without undue experimentation.

Additionally, the present invention is directed to articles of manufacture incorporating the novel compositions and novel films or sheeting of the present invention. The articles can be produced utilizing any suitable technique.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLE 1

In this Example 1 there was utilized as a stabilizer the following composition, prepared as described herein. At ambient temperature, 2470 pounds (1120 kilograms) of Bayer's MAKROLON 5308 polycarbonate powder, which is based on bis(phenol) A and has melt flow rates at 300° C. and 1.2 kg load of 11.5 grams/10 minutes by ASTM method D 1238, and 130 pounds (58.9 kilograms) of distearyl pentaerythritol diphosphite were charged to a JAYGO Model No. JRB100 ribbon blender, having a working capacity of 3000 pounds of polycarbonate powder. The weight ratio of polycarbonate to diphosphite was 95:5. The ribbon blender was agitated at a rate of 25 rpm (revolutions per minute) while adding the diphosphite and for a further 10 minutes. There was obtained 2600 pounds (1179 kilograms) of undried, powdered concentrate that was then pelletized as follows. A 40 mm (millimeter) Werner-Pfleiderer Model ZSK-40 twin screw extruder was operated at a screw speed of 250 rpm and at barrel set temperatures as indicated in the table below.

| Barrel Zone | 1 (feed) | 2 | 3 | 4 | 5 | 6 | 7 | 8 | 9 (die) |
|---|---|---|---|---|---|---|---|---|---|
| Temperature | | | | | | | | | |
| ° C. | Heater Off | Heater Off | 180 | 220 | 220 | 220 | 220 | 220 | 230 |
| (° F.) | Off | Off | 356 | 428 | 428 | 428 | 428 | 428 | 446 |

Resulting melt temperature exiting the die was 240° C. (464° F.) using a six-hole die (individual die hole size: 3.61 mm or 0.142 inch). The powdered, blended mixture of polycarbonate (95%) and diphosphite (5%) was metered to the feed zone of the extruder by means of an Accu Rate MDL 8000W loss-in-weight feeder, produced by Accu Rate, Inc. The feeder was operated at a rate of 150 pounds per hour (68 kilograms per hour) with the barrel vented at the seventh zone. The six strands or rods exiting from the extruder die were conducted through a 25° C. (77° F.) cooling water bath and cut on a Cumberland Model 6 Quietizer pelletizer, produced by the Cumberland Engineering Division of John Brown, Inc. The cylindrical concentrate pellets were then classified according to size on a Carrier Model IDLM-1-240-S shaker deck, produced by Carrier Vibrating Equipment Company, before being packaged in polyethylene-lined, fiberboard containers for subsequent use. This blend of polycarbonate and diphosphite is referred to herein as the stabilizer concentrate.

In carrying out this Example 1, a blend was produced comprising 5% by weight, of the above described stabilizer concentrate and 95%, by weight, of a combination of a specified polycarbonate and a specified copolyester. The combination comprised 27% by weight of the polycarbonate and 73% by weight of the copolyester. The specified polycarbonate was Bayer's MAKROLON 2608, which is based on bis(phenol) A and has melt flow rates at 300° C. and 1.2 kg load of 11.5 grams/10 minutes by ASTM method D 1238, and the copolyester was comprised of 100 mol percent 1,4-cyclohexanedimethanol (CHDM), 26 mol percent isophthalic acid (IPA), and 74 mol percent terephthalic acid (TPA) with and I.V. of 0.75 dL/g. Prior to blending, the polycarbonate was dried in a desiccated air dryer at 250° F. (121° C.) for 4 to 6 hours. The copolyester was dried, prior to blending, in a separate desiccated air dryer at 150° F. (65.6° C.) for 4 to 6 hours. 22 pounds (10 kilograms) of polycarbonate, 73 pounds (33 kilograms) of copolyester, and 5 pounds (2.3 kilograms) of stabilizer concentrate were blended together using a Conair WSB-240 weigh scale pellet blender. The blend of polycarbonate, copolyester, and stabilizer concentrate was then vacuum transferred from the Conair WSB-240 blender to the hopper of a 3.5 inch (90 millimeter) Breyer sheet extrusion line, Equipment No. 190-63846-1. The Breyer extrusion system is controlled by electrical heaters that were set at the following setpoints:

| Extruder Zone | Temperature Degrees F. (C.) | Extruder Zone | Temperature Degrees F. (C.) |
|---|---|---|---|
| Extruder zone 1 | 525 (274) | Die bottom zone 23 | 442 (228) |
| Extruder zone 2 | 525 (274) | Die bottom zone 25 | 450 (232) |
| Extruder zone 3 | 460 (238) | Die bottom zone 27 | 455 (235) |
| Extruder zone 4 | 460 (238) | Die bottom zone 29 | 456 (236) |
| Extruder zone 5 | 460 (238) | Die bottom zone 31 | 460 (238) |
| Extruder zone 6 | 460 (238) | Die top zone 24 | 442 (228) |
| Extruder zone 7 | 460 (238) | Die top zone 26 | 450 (232) |
| Screen changer | 460 (238) | Die top zone 28 | 455 (235) |
| Adapter | 460 (238) | Die top zone 30 | 456 (236) |
| Gear Pump | 460 (238) | Die top zone 32 | 460 (238) |
| Adapter | 460 (238) | | |
| Coex block | 460 (238) | | |
| Adapter | 460 (238) | | |

The extrusion screw used was a 33:1 L/D barrier type, two stage screw produced by Breyer. The extruder was vented in zone 5 using a vacuum to remove any gases that may form in the melted plastic during the extrusion process. The screw was internally cooled with 65° F. (18.3° C.) water in the feed section only. The blend of pellets was extruded into sheet using conventional extrusion practices to produce a sheet product that was 0.118 inches (3 millimeters) thick. The extruder, running at 70 rpm, processed the melt blend through a screen pack, a Maag gear pump running at 43 rpm, a Breyer feedblock and then through a 52 inch (1320 millimeters) wide Cloeren heavy gauge sheet die.

The extrudate, as it exited the die, was extruded into sheet using a Breyer rollstack with three 16-inch (406 millimeter) diameter highly polished water-cooled rolls. The roll temperatures were controlled at 158° F. (70° C.) for the first roll, 180° F. (82° C.) for the second roll, and 201° F. (94° C.) for the third roll. The conveyer linespeed was 35.17 inches per minute (893 millimeters per minute). The sheet was then transferred down the conveyer system through a set of edge trim knives to a Breyer cross cut saw where the pieces of sheet were cut into 24 inches by 34 inches (0.61 meters by 0.86 meters) pieces for testing purposes.

It was observed visually that the sheeting produced from the specified polycarbonate/copolyester blend could be thermoformed without pre-drying the sheet. This is a completely unexpected result. Exemplification of this effect was shown in that the sheeting of Example 1 was thermoformed at 325° F. (163° C.) to provide an automobile valve cover, 24 inches by 34 inches (0.61 meters by 0.86 meters) with a draw over 6 inches (15.24 cm), without pre-drying the sheeting. The valve cover was visually observed to be clear, transparent and with a good appearance. Also, unexpectedly, no blisters were observed. Similarly good results can be achieved using a PCT copolyester containing 17 mol % isophthalic acid having an I.V. of 0.74 dL/g.

EXAMPLE 2

The procedure of Example 1 was followed except that the amounts of polycarbonate and copolyester were varied. In this Example 2, the combination of polycarbonate and copolyester comprised 35% by weight of polycarbonate and 65% by weight of copolyester. The blend of this Example 2 was extruded into sheeting having a thickness of 82 mils (2.08 mm) at 295° C. (563° F.). In the absence of pre-drying, the sheet was thermoformed into an automobile valve cover, 24 inches by 34 inches (0.61 meters by 0.86 meters) with a draw over 6 inches (15.24 cm) at 160° C. (320° F.). It was visually observed that the thermoformed valve cover had a good appearance and, unexpectedly, no blisters. Similarly good results can be achieved using a PCT copolyester containing 5 mol % naphthalenedicarboxylic acid and 15 mol % isophthalic acid having an I.V. of 0.85 dL/g.

EXAMPLE 3

The procedure of Example 1 was followed except that the amounts of polycarbonate and copolyester were varied. In this Example 2, the combination of polycarbonate and copolyester comprised 15% by weight polycarbonate and 85% by weight of copolyester. The blend of this Example 3 was extruded into sheeting having a thickness of 55 mils (1/39 mm). In the absence of any pre-drying, the sheets were thermoformed, and the resultant thermoformed parts had good appearance and there were no blisters.

EXAMPLE 4 (COMPARATIVE)

The procedure of Example 1 was followed except that the amounts of polycarbonate and copolyester were varied. In this Example 4, the combination of polycarbonate and copolyester comprised 50% by weight of polycarbonate and 50% by weight of copolyester. This 50150 pellet blend was extruded into sheeting having a thickness of 118 mils (3.0 mm) at 295° C. (563° F.). The sheet was thermoformed into an automobile valve cover, 24 inches by 34 inches (0.61 meters by 0.86 meters) with a draw over 6 inches (15.24 cm) at 180° C. (356° F.), in the absence of any pre-drying. In this instance, however, where the pellet blend was 50/50, polycarbonate to copolyester, the thermoformed valve covers were visually observed to have blisters.

From the above examples, it is apparent that the amount of polycarbonate to specified copolyester, in the blend, is critical in producing films that are thermoformable, in the absence of pre-drying, that are characterized by not having blisters.

The invention has been described above in detail with particular reference to preferred embodiments thereof, but it will be understood that variations and modifications other than as specifically described herein can be effected within the spirit and scope of the invention. Moreover, all patents, patent applications, provisional patent applications, and literature references cited above are incorporated herein by reference for any disclosure pertinent to the practice of this invention.

We claim:

1. A transparent film or sheet extruded from a blend composition comprising:

(A) from about 15 to about 40 weight percent, based on the total blend composition, of at least one polycarbonate, and (B) from about 60 to about 85 weight percent, based on the total blend composition, of at least one copolyester comprising (a) an acid component comprising from about 65 to about 85 mol percent of a dicarboxylic acid selected from the group consisting of terephthalic acid, naphthalenedicarboxylic acid, 1,4-cyclohexanedicarboxylic acid and mixtures thereof; from about 15 to about 35 mol percent isophthalic acid; and from about 0 to about 20 mol percent of other dicarboxylic acid units having from about 4 to about 40 carbon atoms, wherein the total mol percent of dicarboxylic acid units is equal to 100 mol percent; and (b) a glycol component comprising from about 80 to 100 mol percent of 1,4-cyclohexanedimethanol and from 0 to about 20 mol percent of other glycol units having from about 3 to about 12 carbon atoms, wherein the total mol percent of glycol units is equal to 100 mol percent;

wherein the total units of the copolyester is equal to 200 mol percent, the copolyester has an inherent viscosity of from about 0.5 to about 1.5 dL/g, determined in accordance with ASTM Test Method D2857-70, and the film or sheet is characterized by being thermoformable without previous drying.

2. The film or sheet according to claim 1 wherein the acid component of the copolyester comprises terephthalic acid.

3. The film or sheet according to claim 1 wherein the glycol component of the copolyester is 100 mol percent of 1,4-cyclohexanedimethanol.

4. The film or sheet according to claim 1 wherein the copolyester comprises 100 mol percent 1,4-cyclohexanedimethanol, about 26 mol percent isophthalic acid, and about 74 mol percent terephthalic acid.

5. The film or sheet according to claim 1 wherein the polycarbonate is present in an amount of about 20 to about 28 weight percent and the copolyester is present in an amount of about 80 to about 72 weight percent, based on the weight of the total blend composition.

6. The film or sheet formed from a blend composition according to claim 1 wherein the blend composition further comprises a phosphite stabilizer.

7. A thermoformed article of manufacture produced from the film or sheet defined in claim 1.

8. A thermoformed article of manufacture free of blisters formed from the film or sheet of claim 1 wherein the film or sheet is formed from a blend composition comprising:

(A) from about 20 to about 28 weight percent, based on the total blend composition, of at least one polycarbonate, and (B) from about 80 to about 72 weight percent, based on the total blend composition, of at least one copolyester comprising (a) an acid component comprising from about 65 to about 85 mol percent of a dicarboxylic acid selected from the group consisting of terephthalic acid, naphthalenedicarboxylic acid, 1,4-cyclohexanedicarboxylic acid and mixtures thereof; from about 15 to about 35 mol percent isophthalic acid; and from about 0 to about 20 mol percent of other dicarboxylic acid units having from about 4 to about 40 carbon atoms, wherein the total mol percent of dicarboxylic acid units is equal to 100 mol percent; and (b) a glycol component consisting of 100 mol percent of 1,4-cyclohexanedimethanol, wherein the total mol percent of glycol units is equal to 100 mol percent;

wherein the total units of the copolyester is equal to 200 mol percent, the copolyester has an inherent viscosity of from about 0.5 to about 1.5 dL/g, determined in accordance with ASTM Test Method D2857-70, and the film or sheet is characterized by being thermoformable without previous drying.

9. A process for producing an article of manufacture free of blisters comprising thermoforming the film or sheet of claim 1.

10. A process for producing an article of manufacture free of blisters comprising theremoforming the film or sheet of claim 1 wherein the film or sheet is formed from a blend composition comprising:

(A) from about 20 to about 28 weight percent, based on the total blend composition, of at least one polycarbonate, and (B) from about 80 to about 72 weight percent, based on the total blend composition, of at least one copolyester comprising (a) an acid component comprising from about 65 to about 85 mol percent of a dicarboxylic acid selected from the group consisting of terephthalic acid, naphthalenedicarboxylic acid, 1,4-cyclohexanedicarboxylic acid and mixtures thereof; from about 15 to about 35 mol percent isophthalic acid; and from about 0 to about 20 mol percent of other dicarboxylic acid units having from about 4 to about 40 carbon atoms, wherein the total mol percent of dicarboxylic acid units is equal to 100 mol percent; and (b) a glycol component consisting 100 mol percent of 1,4-cyclohexanedimethanol, wherein the total mol percent of glycol units is equal to 100 mol percent; wherein the total units of the copolyester is equal to 200 mol percent, the copolyester has an inherent viscosity of from about 0.5 to about 1.5 dL/g, determined in accordance with ASTM Test Method D2857-70, and the film or sheet is characterized by being thermoformable without previous drying.

* * * * *